(12) United States Patent
Watson

(10) Patent No.: US 8,028,463 B2
(45) Date of Patent: Oct. 4, 2011

(54) FISHING POLE HOLDER

(76) Inventor: Ricky Wayne Watson, Tarpon Springs, FL (US)

( * ) Notice: Subject to any disclaimer, the term of this patent is extended or adjusted under 35 U.S.C. 154(b) by 521 days.

(21) Appl. No.: 12/228,643

(22) Filed: Aug. 14, 2008

(65) Prior Publication Data
US 2010/0037508 A1  Feb. 18, 2010

(51) Int. Cl.
*A01K 97/10* (2006.01)
(52) U.S. Cl. .................... 43/21.2; 297/188.08
(58) Field of Classification Search ............ 43/21.2; 248/534, 538; 297/188.08, 188.01
See application file for complete search history.

(56) References Cited

U.S. PATENT DOCUMENTS

| | | | |
|---|---|---|---|
| 1,815,353 A * | 7/1931 | Gerow et al. ................ 248/538 |
| 3,339,869 A | 9/1967 | Andersen | |
| 4,007,902 A | 2/1977 | Pettee | |
| 5,325,620 A * | 7/1994 | Reed et al. ................ 43/21.2 |
| 5,365,689 A * | 11/1994 | Holliman .................... 43/21.2 |
| 5,533,295 A | 7/1996 | Hochberger | |
| 5,806,827 A | 9/1998 | Gilmore | |
| 6,253,484 B1 * | 7/2001 | O'Connor ..................... 43/21.2 |
| 6,338,465 B1 * | 1/2002 | Stoner ............................ 248/530 |
| 6,681,517 B1 * | 1/2004 | Solomon ........................ 43/21.2 |
| 6,718,682 B1 * | 4/2004 | Seitsinger et al. ............. 43/21.2 |
| 2006/0137236 A1 * | 6/2006 | Diederichs .................... 43/21.2 |
| 2006/0218844 A1 * | 10/2006 | Oliver et al. .................. 43/21.2 |
| 2007/0283614 A1 * | 12/2007 | Kessler et al. ................. 43/54.1 |

FOREIGN PATENT DOCUMENTS

| | | | |
|---|---|---|---|
| FR | 2574625 A1 * | 6/1986 |
| GB | 2164531 A * | 3/1986 |
| WO | WO 02/35928 A1 | 4/2002 |
| WO | WO 2004/017722 A3 | 4/2004 |
| WO | WO 2004/030449 A1 | 4/2004 |

\* cited by examiner

*Primary Examiner* — Christopher P Ellis

(57) ABSTRACT

A fishing pole holder that can be used in specific situations where a folding chair or chair with a intersecting rods or support structure is available, most common situation of a fisherman is that the fisherman is seated in a chair with his tackle box with a fishing pole holder that is staked into the ground to hold the pole and allow the fisherman to do other tasks, such as drinking while the pole remains fixed in a holder of some sort and type. There have been various types of fishing pole holders, This invention is created to simplify the number of things that is normally carried in order to fish, when a folding chair or chair with intersecting rods or support structure is available.

14 Claims, 3 Drawing Sheets

FISHING POLE HOLDER

FIELD OF THE INVENTION

The present invention relates to fishing pole or rod holders

BACKGROUND OF THE INVENTION

There have been many attempts to solve the problem of securing a fishing pole while the fisherman is not holding onto the fishing pole itself. The most common method of securing a fishing pole is to drive a cylinder type holder with a stake into the ground; this is not a securable system when the ground is sand, when the person is fishing on a beach. The second method of solving this problem is to create a tripod system or a type of stand to secure the fishing pole to, however problems with this system is that the stand sits on the ground and has no secure means to remain stationary to the ground. The third method is to use the fisherman's legs or body to attach a pole to or use the legs to secure the cylinder type holder to, this method of securing a fishing pole is tedious to the fisherman and not a long term solution U.S. Pat. No. 3,339,869
U.S. Pat. No. 4,007,902
U.S. Pat. No. 5,365,689
U.S. Pat. No. 5,533,295
U.S. Pat. No. 5,806,827
U.S. Pat. No. 6,338,465
WO 02/35928 A1
WO 2004/017722 A3
WO 2004/030449 A1

U.S. Pat. No. 3,339,869 Sand Spike Holder For Fishing Rods, this invention requires a person to drive a stake into the ground surface then attaching the upper part of the driven spike that is in the ground, this invention requires an interconnecting lug to create a connection in between these two parts. The shortcoming of this invention is that the spike is required to be drive in the soil to secure the holder and is also dependent on the conditions of the sand or soil to maintain enough pressure to keep the holder upright, this solution also is separate from the fisherman, and the pole is left at a distance from the fisherman's folding chair, thus creating a time delay from the realization of the catching of a fish; to an action to be taken once a strike from a fish is taken. This solution requires two parts and the construction of a interconnection tabs to connect together to create a fishing pole holder, this is a expensive solution, the fishing pole holder is a single piece construction which the holes and elongated side notch can be either cut when making the device or a single piece construction during an injection molding process to make the invention.

U.S. Pat. No. 4,007,902 Fishing Rod Holder, this invention requires a person to drive a stake into the ground surface The shortcoming of this invention is that the spike is required to be drive in the soil to secure the holder and is also dependent on the conditions of the sand or soil to maintain enough pressure to keep the holder upright, this solution also is separate from the fisherman, and the pole is left at a distance from the fisherman's folding chair, thus creating a time delay from the realization of the catching of a fish; to an action to be taken once a strike from a fish is taken. This solution requires three parts and the construction of a hinge joint to connect together the stake portion and the actual fishing pole holder section to create a completed fishing pole holder, this is a expensive solution, the fishing pole holder is a single piece construction which the holes and elongated side notch can be either cut when making the device or a single piece construction during an injection molding process to make the invention.

U.S. Pat. No. 5,533,295 Fishing Pole Holder, this invention requires a person to drive the stakes into the ground surface The shortcoming of this invention is that the spikes are required to be drive in the soil to secure the tripod this spikes are dependent on the conditions of the sand or soil to maintain enough pressure to keep the tripod upright, this solution also creates an tripod in order to reduce the requirement of the soil to maintain structure to provide support to each individual leg of the tripod to keep the fishing rod holder upright. This solution is separate from the fisherman, and the tripod is left at a distance from the fisherman's folding chair, thus creating a time delay from the realization of the catching of a fish; to an action to be taken once a strike from a fish is taken. This solution requires five parts at a minimum, the three tripod stake and leg combination plus two hinge joint plus a fishing rod holder to create a completed fishing pole holder, this is a expensive solution, the fishing pole holder is a single piece construction which the holes and elongated side notch can be either cut when making the device or a single piece construction during an injection molding process to make the invention.

U.S. Pat. No. 5,806,827 Rotatable Fishing Rod Holder Assembly For A Cart, this invention solution was to create an entire cart to secure the fishing rod. The shortcoming of this invention is that the fishing pole is not secure to the ground; it is set on wheels with two rods to secure the fishing pole. This invention also has no large weight to secure the cart assembly. This solution is separate from the fisherman, and the cart can be left at a distance from the fisherman's folding chair, thus creating a time delay from the realization of the catching of a fish; to an action to be taken once a strike from a fish is taken. This solution requires 11 parts at a minimum, the cart, plus horizontal and vertical rods, wheels, a board, four cords, hook, tube, wingnut, bolts, to create a completed fishing pole holder, this is a expensive solution, the fishing pole holder is a single piece construction which the holes and elongated side notch can be either cut when making the device or a single piece construction during an injection molding process to make the invention.

U.S. Pat. No. 6,338,465 B1 Fishing Rod Holder, this invention solution requires a person to drive the complete structure into the ground surface The shortcoming of this invention is that the support shaft and anchor vane is required to be driven in the soil to secure the holder and is also dependent on the conditions of the sand or soil to maintain enough pressure to keep the fishing rod holder upright, this solution also is separate from the fisherman, and if the rod holder is left at a distance from the fisherman's folding chair, thus creating a time delay from the realization of the catching of a fish; to an action to be taken once a strike from a fish is taken. This solution requires four parts at a minimum, the support structure for the fishing rod, the strut for the support shaft, the support shaft for the entire structure, the anchor vane. This is a expensive solution, the fishing pole holder is a single piece construction which the holes and elongated side notch can be either cut when making the device or a single piece construction during an injection molding process to make the invention.

WO 02/359928 Fishing Rod Support Holder, this invention solution requires a person to secure a curved plate to the person, strap the plate to the person, buckles to hold the straps, a transverse pin to keep the pole from twisting, the arm strength to secure the fishing rod to the fishing rod holder plate. This invention lacks the use of the fisherman's body weight to secure the fishing rod; this invention is constantly using the fisherman's arms to secure the invention. This invention requires eight parts, the plate, the support padding, the straps, the buckle, the butt receptacle, the transverse pin, a persons arm strength to secure the fishing rod to the holder plate, these materials creates an expensive solution for securing a fishing pole. The fishing pole holder is a single piece construction which the holes and elongated side not can be either cut when making the device or a single piece construction during an injection molding process to make the invention.

WO 2004/017722 A3 Apparatus And Method For Supporting A Fishing Rod, this invention solution creates a four legged quadpod solution. This solution had no means to secure the fishing pole to the ground, there is no method of adding weight to the invention to secure the apparatus from moving left or right on the surface if moved or jarred by an outside force. This solution is separate from the fisherman, and the pole is left at a distance from the fisherman's folding chair or place that the person is seating or standing, thus creating a time delay from the realization of the catching of a fish; to an action to be taken once a strike from a fish is taken. This solution has four parts to the solution, a support structure for the fishing rod, a support shaft for the support structure of the fishing rod, a spring hinge assembly, a interlooping dual rods for interconnection and support of the total structure. The fishing pole holder is a single piece construction which the holes and elongated side notch can be either cut when making the device or a single piece construction during an injection molding process to make the invention.

WO 2004/030449 A1 The Supporter Of Fishing Rod, this invention creates a three legged tripod solution to secure a fishing rod to a holder assembly. This solution had no means of adding weight to the invention to create a better contact with the surface that the tripod is sitting on in order to secure the fishing pole to the ground This solution is separate from the fisherman, and the pole is left at a distance from the fisherman's folding chair or place that the person is seating or standing, thus creating a time delay from the realization of the catching of a fish; to an action to be taken once a strike from a fish is taken This solution has five parts to the solution, spikes to secure the tripod legs to the surface, tripod legs to provide support for the hinge assembly, a horizontal bar, an assistant supporting member to move up or down, a rod fixture to secure the fishing rod. The fishing pole holder is a single piece construction which the holes and elongated side notch can be either cut when making the device or a single piece construction during an injection molding process to make the invention.

It is therefore an object of the invention to provide support for the fishing pole with an inexpensive alternate means without carrying expensive equipment to secure the fishing pole It is another object of the invention to secure the fishing pole without using a tripod assembly that is normally used to secure a fishing pole It is another object of the invention to not use the ground to secure the fishing pole holder It is another object of the invention to use the weight of the fisherman in a normal condition to secure the fishing pole holder It is another object of the invention to use the support structure of a folding chair to first secure the fishing pole holder and the weight of the fisherman as leverage to secure the fishing pole holder It is another object of the invention to use the fisherman's tackle box to store the fishing pole holder internally, rather than have the fisherman juggle the tackle box, fishing rod, folding chair and a fishing pole holder to the shore where fishing is to take place.

SUMMARY OF THE INVENTION

In accordance with the present invention, there is provided a fishing pole holder that can be used in specific situations where a folding chair or chair with a intersecting rods or support structure is available, most common situation of a fisherman is that the fisherman is seated in a chair with his tackle box with a fishing pole holder that is staked into the ground to hold the pole and allow the fisherman to do other tasks, such as drinking while the pole remains fixed in a holder of some sort and type. There have been various types of fishing pole holders, one is a cylinder assembly type of construction with a stake assembly to drive into the ground, second type is a tripod assembly to provide support for the cylinder assembly, a third type is a plate that the person actually places his feet on the ground to support the cylinder assembly while fishing, all of these assemblies require that the person carry another complete constructed device, with a tackle box and a chair in order to fish in comfort. This invention is created to solve all these problems and reduce the number of things that is normally carried in order to fish, when a folding chair or chair with intersecting rods or support structure is available.

BRIEF DESCRIPTION OF THE DRAWINGS

A complete understanding of the present invention may be obtained by reference to the accompanying drawings, when considered in conjunction with the subsequent, detailed description, in which:

FIG. 1 number 1 is the lower left hand corner of the holder when the holder is set in front of the person sitting in the folding chair. This corner is cut at right angles and the top and bottom face of the holder is cut parallel to the top and bottom surface. FIG. 1 number 2 is the edge of the holder that is closest to the person sitting in the folding chair; this is cut lengthwise 90 degrees relative to the top and bottom surfaces. FIG. 1 number 3 is the lower right corner of the holder. When the holder is set in front of the person sitting in the folding chair this corner is cut at right angles and the top and bottom face of the holder is cut parallel to each top and bottom surface. FIG. 1 number 4 is the elongated circle notch from the edge centered towards the center of the holder. FIG. 1 number 5 is the upper right hand corner of the holder; when the holder is set in front of the person sitting in the chair, this corner is cut at right angles and the top and bottom face of the corner is parallel. FIG. 1 number 6 is the top surface of the holder. FIG. 1 number 7 is an angled circle bore into the holder; this cut is angled towards the edge facing forward. FIG. 1 number 8 is the forward edge of the holder the edge is 90 degrees lengthwise along the length of the holder. FIG. 1 number 9 is the elongated circle notch from the edge centered towards the center of the holder;

FIG. 2 number 10 is the fishing pole. FIG. 2 number 11 is the fishing reel FIG. 2 number 12 is a partial view of the folding chair; the support strut of the folding chair that is running from the arm from the chair to the lower opposite corner of the folding chair. FIG. 2 number 13 shows the intersection of the support rod of the folding chair with the elongated circle notch. FIG. 2 number 14 is the support rod from the armrest to the lower opposite corner. FIG. 2 number 15 is the seat of the folding chair. FIG. 2 number 16 is the intersection of the fishing pole of the angled hole in the holder with the fishing pole resting and leaning forward being supported by the holder. FIG. 2 number 17 shows the intersection of the support rod of the folding chair with the elongated circle notch. FIG. 2 number 18 is the support rods form the armrest to the lower opposite corner. FIG. 2 number 19 is the support rod from the opposing armrest to the opposite corner. FIG. 2 number 20 is the intersection of the support rods creating a vertex that the fishing pole holder is seated and supported; FIG. 3 has partial view of the folding chair with the fishing pole holder placed above the vertex of the support rods of the folding chair. FIG. 3 number 21 is the support strut of the folding chair that is running from the chair to the lower opposite corner of the folding chair. FIG. 2 number 22 is the support rod of the folding chair that is running from the chair to the lower opposite corner FIG. 2 number 23 is the fishing pole holder that is seated above the vertex of the support rods of the folding chair. FIG. 2 number 24 is the partial view of the support rod of the folding chair. FIG. 2 number 25 is the partial view of the support rod of the folding chair. FIG. 3 number 26 shows the intersection of the elongated side notch and the support rod of the folding chair FIG. 3 number 27 is the seat of the folding chair. FIG. 2 number 28 is the partial view of the support rods of the folding chair. FIG. 2 number 29 is the angled bore hole of the fishing pole holder this angled bore hole is set to align the fishing pole along the length of the fishing pole holder FIG. 2 number 30 shows the side of the fishing pole holder that is facing the folding chair. FIG. 2 number 31 is the elongated side notch and the support rod of the folding chair. FIG. 3 number 32 is the support rod that runs form the chair to the lower opposite corner of the folding chair. FIG. 3 number 33 is a partial view of a support rod.

For purposes of clarity and brevity, like elements and components will bear the same designations and numbering throughout the FIGURES.

DESCRIPTION OF THE PREFERRED EMBODIMENT

Figure 1:
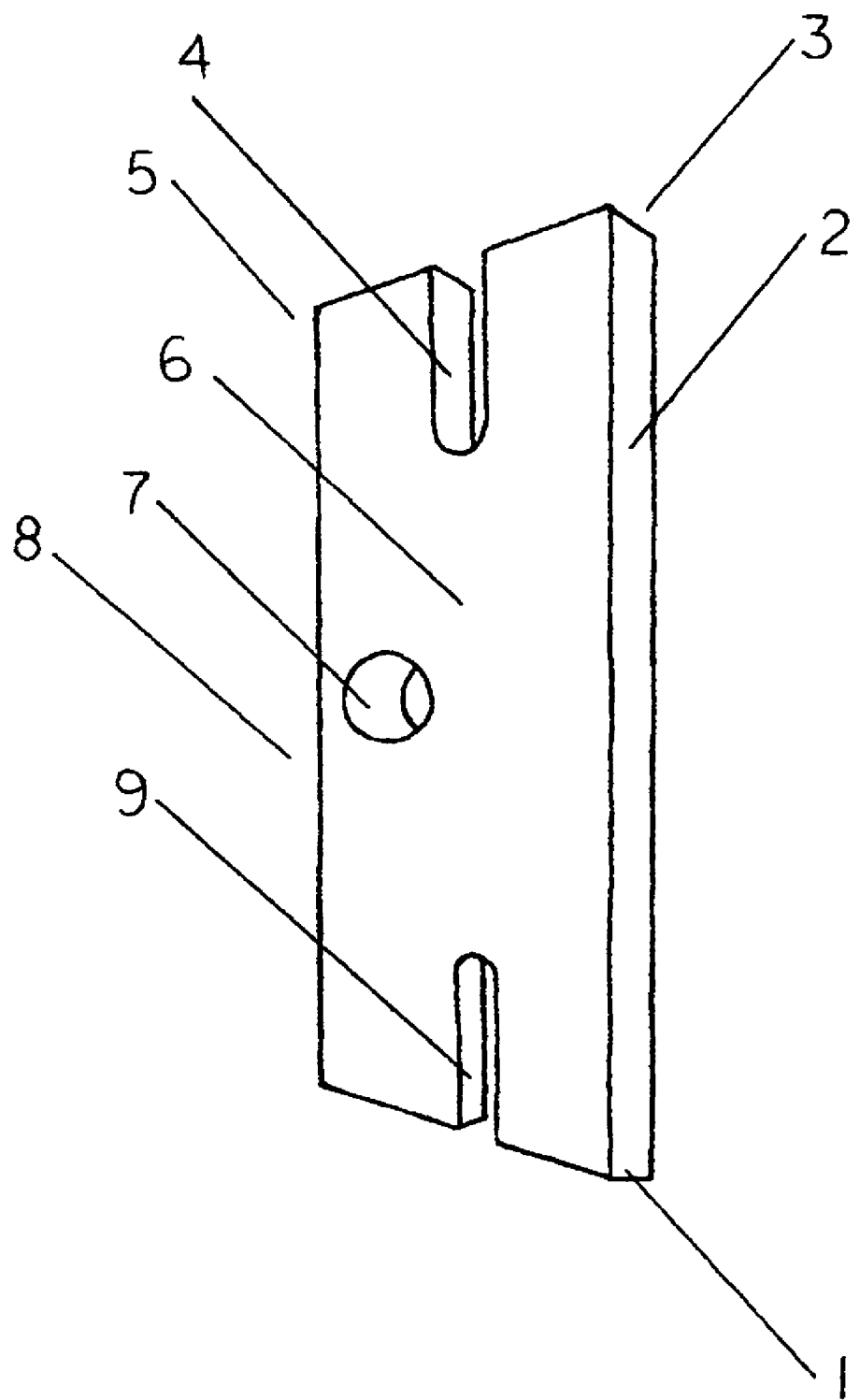
FIG. 1 is a perspective view of a lengthwise view of the fishing pole holder.
Figure 2:
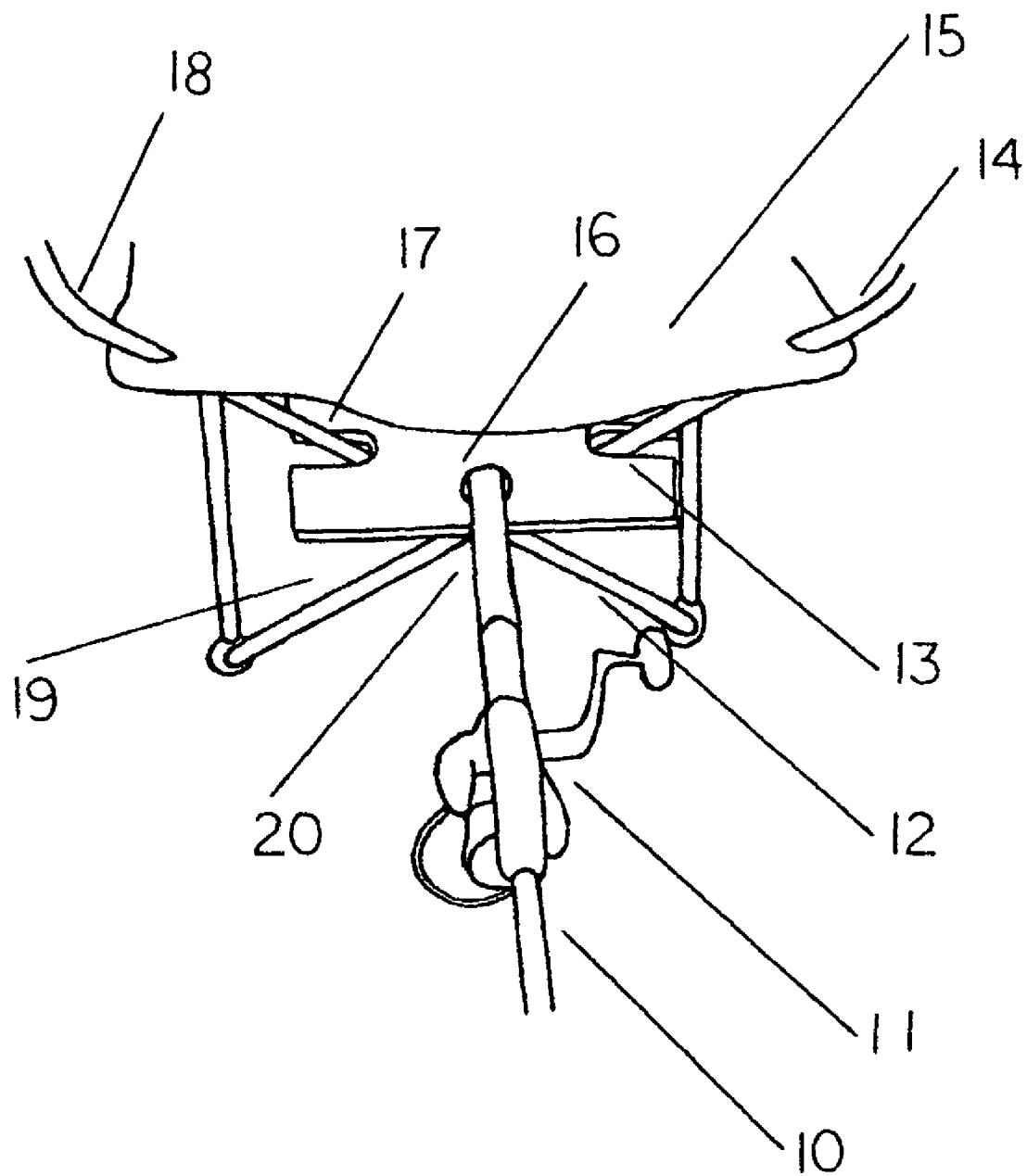
FIG. 2 is a perspective view of a partial view of the folding chair and fishing pole with the fishing pole holder placed above the vertex of the support rods of the folding chair.

FIG. 1 is a lengthwise view of the fishing pole holder 10; FIG. 1 number 1 is the lower left hand corner of the holder when the holder is set in front of the person sitting in the folding chair 18. This corner is cut at right angles and the top and bottom face of the holder is cut parallel to the top and bottom surface. FIG. 1 number 2 is the edge of the holder that is closest to the person sitting in the folding chair 18; this is cut lengthwise 90 degrees relative to the top and bottom surfaces. FIG. 1 number 3 is the lower right corner of the holder. When the holder is set in front of the person sitting in the folding chair 18 this corner is cut at right angles and the top and bottom face of the holder is cut parallel to each top and bottom surface. FIG. 1 number 4 is the elongated circle notch 14 from the edge centered towards the center of the holder. FIG. 1 number 5 is the upper right hand corner of the holder; when the holder is set in front of the person sitting in the chair 18, this corner is cut at right angles and the top and bottom face of the corner is parallel. FIG. 1 number 6 is the top surface of the holder. FIG. 1 number 7 is an angled circle bore into the holder; this cut is angled towards the edge facing forward. FIG. 1 number 8 is the forward edge of the holder the edge is 90 degrees lengthwise along the length of the holder. FIG. 1 number 9 is the elongated circle notch 14 from the edge centered towards the center of the holder FIG. 2 is a perspective view of a partial view of the folding chair 18 and fishing pole with the fishing pole holder 10 placed above the vertex of the support rods of the folding chair 18. FIG. 2 number 11 is the fishing reel FIG. 2 number 12 is a partial view of the folding chair 18; the support strut of the folding chair 18 that is running from the arm from the chair 18 to the lower opposite corner of the folding chair 18. FIG. 2 number 13 shows the intersection of the folding chair 18 and the support rod of the folding chair 18. FIG. 2 number 14 is the support rod from the armrest to the lower opposite corner. FIG. 2 number 15 is the seat of the folding chair 18. FIG. 2 number 16 is the intersection of the fishing pole the center cut bore of the angled hole in the holder with the fishing pole resting and leaning forward being supported by the holder. FIG. 2 number 17 shows the intersection of the folding chair 18 and the support rod of the folding chair 18. FIG. 2 number 18 is the support rods form the armrest to the lower opposite corner. FIG. 2 number 19 is the support rod from the opposing armrest to the opposite corner. FIG. 2 number 20 is the intersection of the support rods creating a vertex that the fishing pole holder 10 is seated and supported.

Figure 3:
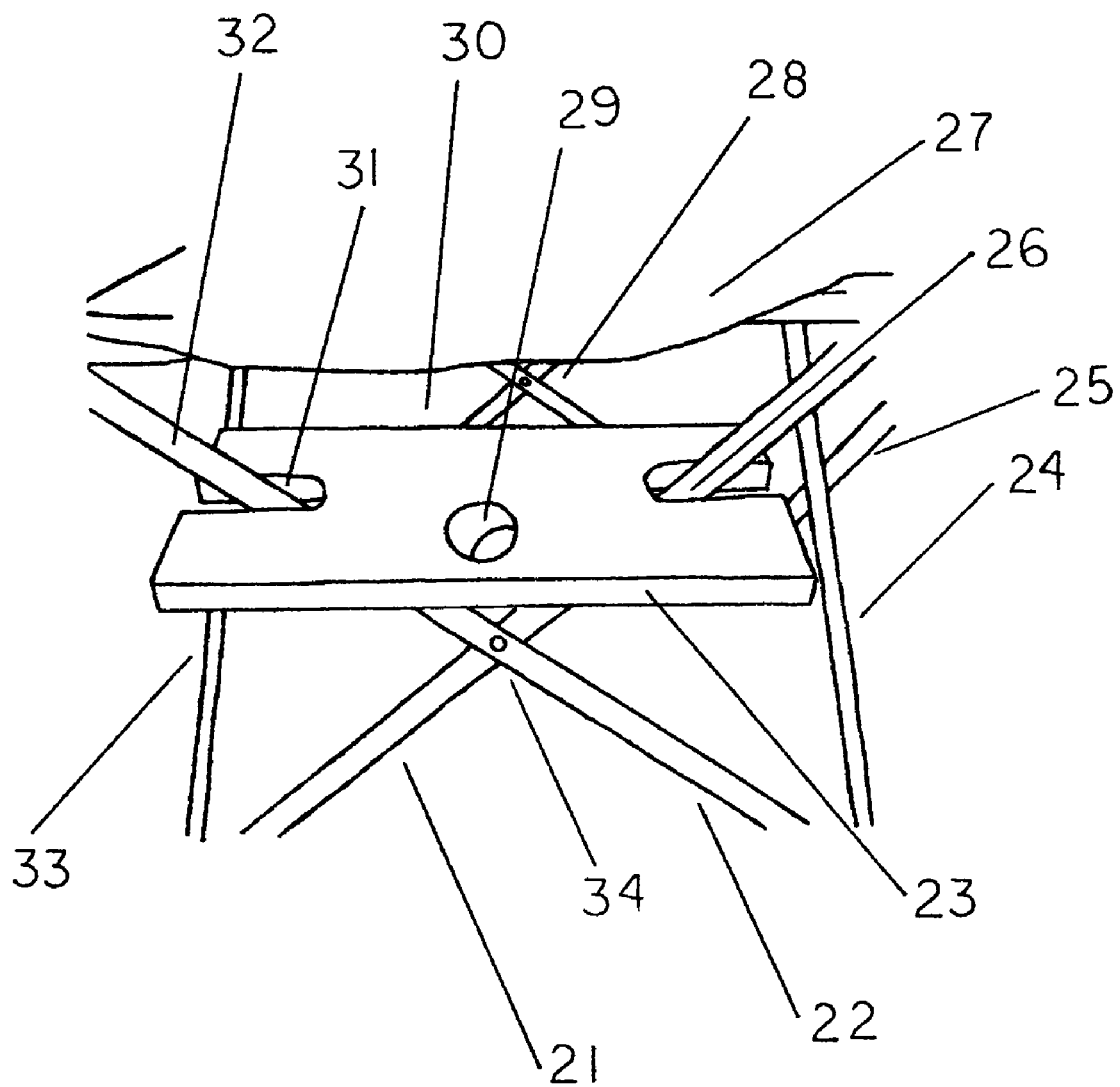
FIG. 3 is a perspective view of an alternative embodiment of the fishing pole holder; the orientation of the bored circle hole is now lengthwise and angled to allow the fishing pole to lay in the direction along the length of the holder. This allows the fishing pole holder to be placed to the side of the folding chair.

FIG. 3 is a perspective view of an alternative embodiment of the fishing pole holder 10; the orientation of the bored circle hole is now lengthwise and angled to allow the fishing pole to lay in the direction along the length of the holder. This allows the fishing pole holder 10 to be placed to the side of the folding chair 18. FIG. 3 has partial view of the folding chair 18 with the fishing pole holder 10 placed above the vertex of the support rods of the folding chair 18. FIG. 3 number 21 is the support strut of the folding chair 18 that is running from the chair 18 to the lower opposite corner of the folding chair 18. FIG. 2 number 22 is the support rod of the folding chair 18 that is running from the chair 18 to the lower opposite corner FIG. 2 number 23 is the fishing pole holder 10 that is seated above the vertex of the support rods of the folding chair 18. FIG. 2 number 24 is the partial view of the support rod of the folding chair 18. FIG. 2 number 25 is the partial view of the support rod of the folding chair 18. FIG. 3 number 26 shows the intersection of the elongated side cut and the support rod of the folding chair 18 FIG. 3 number 27 is the seat of the folding chair 18. FIG. 2 number 28 is the partial view of the support rods of the folding chair 18. FIG. 2 number 29 is the angled bore hole of the fishing pole holder 10 this angled bore hole is set to align the fishing pole along the length of the fishing pole holder 10 FIG. 2 number 30 shows the side of the fishing pole holder 10 that is facing the folding chair 18. FIG. 2 number 31 is the elongated side cut and the support rod of the folding chair 18. FIG. 3 number 32 is the support rod that runs form the chair 18 to the lower opposite corner of the folding chair 18. FIG. 3 number 33 is a partial view of a support rod.

FIG. 1 is the best method of the invention; FIG. 1 number 6 holder is best made from wood. This material give enough weight to provide support for the fishing pole, this material friction properties allow the holder to remain secure in either dry or wet conditions. FIG. 1 number 4 and number 9 elongated circle notch 14 should be cut to the length that equals one thirds of the length of the holder. This allows enough depth to occur to seat the holder near the vertex that is created from the folding chair 18. Support rods FIG. 1 number 7 is an angled bore hole that is cut at an angle of 60 degrees. Beginning one inch from the top surface of the holder angled so that the fishing pole is leaning away from the holder, and the ending cut is further towards the center of the holder along the bottom surface of the holder.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A fishing pole holder for securing a fishing pole to a folding chair; said chair having intersecting rods creating a vertex;
   the fishing pole holder comprising:
   a planar member comprising an angled hole configured to receive a handle of a fishing pole allowing said fishing pole to extend upwardly at an angle with respect to said planar member;
   elongated notches located at either end of said planar member configured to allow the planar member to be received by the intersecting rods within the vertex of the chair.

2. The fishing pole holder in accordance with claim 1, wherein said planar member is made of a millable material.

3. The fishing pole holder in accordance with claim 1, wherein said planar member is injection molded.

4. The fishing pole holder in accordance with claim 1, wherein said angled hole comprises an acute angle less than 90 degrees.

5. The fishing pole holder in accordance with claim 1, wherein said elongated notches located at either end are offset by ½ the width diameter of the elongated notch, in opposite directions.

6. The fishing pole holder in accordance with claim 1, wherein said elongated notches are located in the interior direction of the planar member and are circular milled.

7. The fishing pole holder in accordance with claim 1, wherein said elongated notches are located in the interior direction of the planar member and are square milled.

8. A fishing pole holder in combination with a folding chair for securing a fishing pole; said chair having intersecting rods creating a vertex;
   the fishing pole holder comprising:
   a planar member comprising an angled hole configured to receive a handle of a fishing pole allowing said fishing pole to extend upwardly at an angle with respect to said planar member;
   elongated notches located at either end of said planar member configured to allow the planar member to be received by the intersecting rods within the vertex of the chair.

9. The fishing pole holder in accordance with claim 8, wherein said planar member is made of a millable material.

10. The fishing pole holder in accordance with claim 8, wherein said planar member is injection molded.

11. The fishing pole holder in accordance with claim 8, wherein said angled hole comprises an acute angle less than 90 degrees.

12. The fishing pole holder in accordance with claim 8, wherein said elongated notches located at either end are offset by ½ the width diameter of the elongated notch.

13. The fishing pole holder in accordance with claim 8, wherein said elongated notches are located in the interior direction of the planar member and are circular milled.

14. The fishing pole holder in accordance with claim 8, wherein said elongated notches are located in the interior direction of the planar member and are square milled.

\* \* \* \* \*